United States Patent
Bauco et al.

(10) Patent No.: US 10,534,135 B2
(45) Date of Patent: Jan. 14, 2020

(54) SYSTEMS AND METHODS FOR TRACING CABLES AND CABLES FOR SUCH SYSTEMS AND METHODS

(71) Applicant: CORNING OPTICAL COMMUNICATIONS LLC, Hickory, NC (US)

(72) Inventors: Anthony Sebastian Bauco, Horseheads, NY (US); Douglas Llewellyn Butler, Painted Post, NY (US); Micah Colen Isenhour, Lincolnton, NC (US); David Gustave Ehrenberg, Corning, NY (US)

(73) Assignee: Corning Optical Communications LLC, Charlotte, NC (US)

(*) Notice: Subject to any disclaimer, the term of this patent is extended or adjusted under 35 U.S.C. 154(b) by 0 days.

(21) Appl. No.: 15/868,090

(22) Filed: Jan. 11, 2018

(65) Prior Publication Data
US 2018/0136399 A1    May 17, 2018

Related U.S. Application Data

(63) Continuation of application No. PCT/US2016/042416, filed on Jul. 15, 2016.
(Continued)

(51) Int. Cl.
*G02B 6/28* (2006.01)
*F21V 8/00* (2006.01)
(Continued)

(52) U.S. Cl.
CPC .......... *G02B 6/2852* (2013.01); *G02B 6/001* (2013.01); *G02B 6/0068* (2013.01);
(Continued)

(58) Field of Classification Search
None
See application file for complete search history.

(56) References Cited

U.S. PATENT DOCUMENTS 3,942,859 A * 3/1976 Korodi ................ G02B 6/4416
                                              439/490
4,412,936 A    11/1983 Khmelkov et al.
(Continued)

FOREIGN PATENT DOCUMENTS

| CN | 200941319 Y | 8/2007 |
| CN | 201419706 Y | 3/2010 |

(Continued)

OTHER PUBLICATIONS http://www.dexim.net/list.php?id=7, Dexim product reference, downloaded from the web Feb. 24, 2016. 2 pages.
Kremenakova, et al., "Characterizaion of Side EmmittingPolymeric Optical Fibres," Jounal of Fiber Bioengineering & Informatics 5:4 (2012) pp. 423-431, http://www.jfbi.org, Dec. 2012.
Fiber Optic Products, Inc., "Specifications of our Fiber and Cable," n.d. Retrieved on Aug. 9, 2013, 2 pages.
M. Rajesh, "Polymer Photonics: An Overview," Fabrication and Characterisation, 2011, 38 pages.
(Continued)

*Primary Examiner* — Tina M Wong
(74) *Attorney, Agent, or Firm* — Adam R. Weeks

(57) ABSTRACT

A traceable cable includes at least one data transmission element, a jacket at least partially surrounding the at least one data transmission element, and a tracing optical fiber incorporated with and extending along a length (l) of the cable. The tracing optical fiber includes a core having a first index of refraction and a cladding having a second index of refraction less than the first index of refraction, with the cladding substantially surrounding the core. The tracing optical fiber also includes periodically spaced apart scattering sites spaced along the optical fiber at a spacing ratio of n sites per meter, wherein each scattering site is configured to scatter no more than about 1/(n*l) times optical power provided to the tracing optical fiber. Related systems and methods are also disclosed.

24 Claims, 9 Drawing Sheets

Related U.S. Application Data

(60) Provisional application No. 62/221,774, filed on Sep. 22, 2015, provisional application No. 62/193,643, filed on Jul. 17, 2015.

(51) Int. Cl.
  *G02B 6/02* (2006.01)
  *G02B 6/38* (2006.01)
(52) U.S. Cl.
  CPC ....... *G02B 6/02333* (2013.01); *G02B 6/3873* (2013.01); *G02B 6/0006* (2013.01)

(56) References Cited

U.S. PATENT DOCUMENTS

| | | | |
|---|---|---|---|
| 4,422,719 A | 12/1983 | Orcutt | |
| 4,466,697 A | 8/1984 | Daniel | |
| 4,557,552 A | 12/1985 | Newton et al. | |
| 4,637,686 A | 1/1987 | Iwamoto et al. | |
| 4,712,858 A | 12/1987 | Presby | |
| 4,755,018 A | 7/1988 | Heng et al. | |
| 4,762,416 A | 8/1988 | Lefevre et al. | |
| 4,763,984 A | 8/1988 | Awai et al. | |
| 4,768,854 A | 9/1988 | Campbell et al. | |
| 4,923,274 A | 5/1990 | Dean | |
| 4,995,691 A | 2/1991 | Purcell, Jr. | |
| 5,006,806 A | 4/1991 | Rippingale et al. | |
| 5,017,873 A | 5/1991 | Rippingale et al. | |
| 5,040,867 A | 8/1991 | de Jong et al. | |
| 5,122,750 A | 6/1992 | Rippingale et al. | |
| 5,179,611 A | 1/1993 | Umeda et al. | |
| 5,206,065 A | 4/1993 | Rippingale et al. | |
| 5,305,405 A | 4/1994 | Emmons et al. | |
| 5,329,348 A | 7/1994 | Nimura et al. | |
| 5,333,228 A | 7/1994 | Kingstone | |
| 5,377,292 A | 12/1994 | Bartling et al. | |
| 5,394,496 A | 2/1995 | Caldwell et al. | |
| 5,395,362 A | 3/1995 | Sacharoff et al. | |
| 5,432,876 A | 7/1995 | Appledorn et al. | |
| 5,463,706 A | 10/1995 | Dumont et al. | |
| 5,500,913 A | 3/1996 | Allen et al. | |
| 5,591,160 A | 1/1997 | Reynard | |
| 5,666,453 A | 9/1997 | Dannenrnann | |
| 5,741,152 A | 4/1998 | Boutros | |
| 5,764,043 A | 6/1998 | Czosnowski et al. | |
| 5,835,654 A | 11/1998 | Bergmann | |
| 5,937,127 A | 8/1999 | Zarian et al. | |
| 5,979,188 A | 11/1999 | Ojha | |
| 5,982,967 A | 11/1999 | Mathis et al. | |
| 6,126,325 A | 10/2000 | Yamane et al. | |
| 6,137,928 A | 10/2000 | Albrecht | |
| 6,137,935 A | 10/2000 | Bohme et al. | |
| 6,159,037 A | 12/2000 | Madsen et al. | |
| 6,173,097 B1 | 1/2001 | Throckmorton et al. | |
| 6,257,750 B1 | 7/2001 | Strasser et al. | |
| 6,293,081 B1 | 9/2001 | Grulick et al. | |
| 6,301,418 B1 | 10/2001 | Freier et al. | |
| 6,311,000 B1 | 10/2001 | Schneider | |
| 6,314,713 B1 | 11/2001 | Fitz et al. | |
| 6,317,553 B1 | 11/2001 | Harper, Jr. et al. | |
| 6,347,172 B1 * | 2/2002 | Keller ................ | G02B 6/0006 385/102 |
| 6,356,690 B1 | 3/2002 | McAlpine et al. | |
| 6,379,054 B2 | 4/2002 | Throckmorton et al. | |
| 6,388,194 B1 | 5/2002 | Ryeczek | |
| 6,403,947 B1 | 6/2002 | Hoyt et al. | |
| 6,425,694 B1 | 7/2002 | Szilagyi et al. | |
| 6,439,780 B1 | 8/2002 | Mudd et al. | |
| 6,456,768 B1 | 9/2002 | Boncek et al. | |
| 6,456,785 B1 | 9/2002 | Evans | |
| 6,471,412 B1 | 10/2002 | Belenkiy et al. | |
| 6,519,396 B2 | 2/2003 | Schneider et al. | |
| 6,526,200 B1 | 2/2003 | Davie | |
| 6,532,328 B1 | 3/2003 | Kline | |
| 6,554,485 B1 | 4/2003 | Beatty et al. | |
| 6,560,390 B2 | 5/2003 | Grulick et al. | |
| 6,577,243 B1 | 6/2003 | Dannenmann et al. | |
| 6,596,943 B1 | 7/2003 | Ward | |
| 6,606,431 B2 | 8/2003 | Unsworth | |
| 6,640,028 B1 | 10/2003 | Schroll et al. | |
| 6,678,449 B2 | 1/2004 | Thompson et al. | |
| 6,695,491 B1 | 2/2004 | Leeman et al. | |
| 6,704,479 B2 | 3/2004 | Koplow | |
| 6,710,254 B2 | 3/2004 | Yueh | |
| 6,712,524 B2 | 3/2004 | Beatty et al. | |
| 6,728,453 B2 | 4/2004 | Petryszak | |
| 6,758,600 B2 | 7/2004 | Del Grosso et al. | |
| 6,798,956 B2 | 9/2004 | Morrison | |
| 6,816,661 B1 | 11/2004 | Barnes et al. | |
| 6,823,120 B2 | 11/2004 | Hurley et al. | |
| 6,829,651 B1 | 12/2004 | Bass et al. | |
| 6,876,809 B1 | 4/2005 | Sonderegger et al. | |
| 6,906,505 B2 | 6/2005 | Brunet et al. | |
| 6,933,438 B1 | 8/2005 | Watts et al. | |
| 6,969,273 B2 | 11/2005 | Chen | |
| 6,979,223 B2 | 12/2005 | Chen | |
| 7,020,369 B2 | 3/2006 | Lodge, Jr. et al. | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,090,411 B2 | 8/2006 | Brown | |
| 7,121,707 B2 | 10/2006 | Currie et al. | |
| 7,147,383 B2 | 12/2006 | Sullivan | |
| 7,164,819 B2 | 1/2007 | Jenson et al. | |
| 7,215,860 B2 | 5/2007 | Engelberth et al. | |
| 7,217,152 B1 | 5/2007 | Xin et al. | |
| 7,221,284 B2 | 5/2007 | Scherer et al. | |
| 7,242,831 B2 | 7/2007 | Fee | |
| 7,313,304 B2 | 12/2007 | Andrews et al. | |
| 7,330,632 B1 | 2/2008 | Buelow, II et al. | |
| 7,401,961 B2 | 7/2008 | Longatti et al. | |
| 7,406,231 B1 | 7/2008 | Beck et al. | |
| 7,433,565 B2 | 10/2008 | Joseph et al. | |
| 7,524,082 B2 | 4/2009 | North | |
| 7,544,909 B2 | 6/2009 | Dhir | |
| 7,572,066 B2 | 8/2009 | De Jong et al. | |
| 7,596,293 B2 | 9/2009 | Isenhour et al. | |
| 7,603,020 B1 | 10/2009 | Wakileh et al. | |
| 7,618,175 B1 | 11/2009 | Hulse | |
| 7,620,279 B2 * | 11/2009 | Joseph ................ | A61C 17/043 385/123 |
| 7,653,277 B2 | 1/2010 | Andrews et al. | |
| 7,671,279 B2 | 3/2010 | Yin | |
| 7,748,860 B2 | 7/2010 | Brunet | |
| 7,817,884 B2 | 10/2010 | Demeritt et al. | |
| 7,920,764 B2 | 4/2011 | Kewitsch | |
| 7,932,805 B2 | 4/2011 | Darr et al. | |
| 7,948,226 B2 | 5/2011 | Rathbun, II et al. | |
| 8,000,576 B2 | 8/2011 | Chen et al. | |
| 8,102,169 B2 | 1/2012 | Law et al. | |
| 8,150,227 B2 | 4/2012 | Kewitsch | |
| 8,152,385 B2 | 4/2012 | De Jong et al. | |
| 8,167,471 B1 | 5/2012 | Moritz | |
| 8,314,603 B2 | 11/2012 | Russell | |
| 8,322,871 B1 | 12/2012 | Knaggs et al. | |
| 8,331,752 B2 | 12/2012 | Biribuze et al. | |
| 8,351,750 B2 | 1/2013 | Fine et al. | |
| 8,408,029 B2 | 4/2013 | De Angelis et al. | |
| 8,414,319 B2 | 4/2013 | Patel et al. | |
| 8,428,405 B2 | 4/2013 | Kewitsch | |
| 8,492,448 B2 | 7/2013 | Dewa et al. | |
| 8,509,579 B2 | 8/2013 | Martin-Lopez | |
| 8,545,076 B2 | 10/2013 | Bickham et al. | |
| 8,548,293 B2 | 10/2013 | Kachmar | |
| 8,582,939 B2 | 11/2013 | Gimblet et al. | |
| 8,582,940 B2 | 11/2013 | Abernathy et al. | |
| 8,591,087 B2 | 11/2013 | Bickham et al. | |
| 8,620,123 B2 | 12/2013 | Dean, Jr. et al. | |
| 8,620,125 B2 | 12/2013 | Button et al. | |
| 8,662,760 B2 | 3/2014 | Cline et al. | |
| 8,683,827 B2 | 4/2014 | De Angelis et al. | |
| 8,708,724 B2 | 4/2014 | Patel et al. | |
| 8,724,942 B2 | 5/2014 | Logunov et al. | |
| 8,770,525 B2 | 7/2014 | Donaldson et al. | |

(56) References Cited

U.S. PATENT DOCUMENTS

| | | |
|---|---|---|
| 8,787,717 B2 | 7/2014 | Logunov |
| 8,791,829 B2 | 7/2014 | Gustafsson et al. |
| 8,798,419 B2 | 8/2014 | Wessels, Jr. et al. |
| 8,805,141 B2 | 8/2014 | Fewkes et al. |
| 8,896,286 B2 | 11/2014 | Abuelsaad et al. |
| 8,896,287 B2 | 11/2014 | Abuelsaad et al. |
| 8,897,612 B2 | 11/2014 | Logunov |
| 8,903,212 B2 | 12/2014 | Kachmar |
| 8,909,013 B1 | 12/2014 | Jiang et al. |
| 8,929,703 B2 | 1/2015 | Logunov et al. |
| 9,025,923 B2 | 5/2015 | Logunov et al. |
| 9,073,243 B2 | 7/2015 | Gimblet et al. |
| 9,146,347 B2 | 9/2015 | Logunov et al. |
| 9,182,561 B2 | 11/2015 | Bauco et al. |
| 9,196,975 B2 | 11/2015 | Scherer et al. |
| 9,271,709 B2 | 3/2016 | Grey et al. |
| 9,304,278 B1 | 4/2016 | Bauco et al. |
| 9,388,975 B2 | 7/2016 | Wenger |
| 9,429,731 B2 | 8/2016 | Bookbinder et al. |
| 9,435,713 B2 | 9/2016 | Collier et al. |
| 9,448,380 B2 | 9/2016 | Mogensen |
| 9,507,096 B2 | 11/2016 | Isenhour et al. |
| 9,529,167 B2 | 12/2016 | Wu |
| 9,571,694 B2 | 2/2017 | Hirao |
| 9,671,551 B2 | 6/2017 | Dean, Jr. et al. |
| 9,709,750 B1 | 7/2017 | Kuang et al. |
| 10,120,138 B2 | 11/2018 | Jones |
| 10,234,614 B2 | 3/2019 | Bauco |
| 2001/0002220 A1 | 5/2001 | Throckmorton et al. |
| 2001/0048797 A1 | 12/2001 | Van Dijk et al. |
| 2002/0009282 A1 | 1/2002 | Grulick et al. |
| 2002/0036775 A1 | 3/2002 | Wolleschensky et al. |
| 2002/0037133 A1 | 3/2002 | Unsworth |
| 2002/0136497 A1 | 9/2002 | McGarry et al. |
| 2002/0159735 A1 | 10/2002 | Edvold et al. |
| 2002/0185299 A1 | 12/2002 | Giebel |
| 2003/0002830 A1 | 1/2003 | Petryszak |
| 2003/0016924 A1 | 1/2003 | Thompson et al. |
| 2003/0108270 A1 | 6/2003 | Brimacombe et al. |
| 2003/0108303 A1 | 6/2003 | Asada |
| 2003/0206519 A1 | 11/2003 | Sanders et al. |
| 2003/0222786 A1 | 12/2003 | Dannenmann et al. |
| 2004/0022504 A1 | 2/2004 | Hurley et al. |
| 2004/0052473 A1 | 3/2004 | Seo et al. |
| 2004/0101230 A1 | 5/2004 | Philebrown |
| 2004/0146254 A1 | 7/2004 | Morrison |
| 2004/0160774 A1 | 8/2004 | Lionetti et al. |
| 2004/0179777 A1 | 9/2004 | Buelow, II et al. |
| 2004/0196648 A1 | 10/2004 | Franklin et al. |
| 2005/0052174 A1 | 3/2005 | Angelo et al. |
| 2005/0089284 A1 | 4/2005 | Ma |
| 2005/0212503 A1 | 9/2005 | Deibele |
| 2005/0271338 A1 | 12/2005 | Livingston |
| 2006/0104578 A1 | 5/2006 | Herbst |
| 2006/0133750 A1 | 6/2006 | Lee |
| 2006/0140562 A1 | 6/2006 | Joseph et al. |
| 2006/0193575 A1 | 8/2006 | Greenwood et al. |
| 2006/0232385 A1 | 10/2006 | Scherer et al. |
| 2006/0285350 A1 | 12/2006 | Wang |
| 2007/0116402 A1 | 5/2007 | Slade et al. |
| 2007/0153508 A1* | 7/2007 | Nall .................. F21V 21/002 362/219 |
| 2007/0217749 A1 | 9/2007 | Jong et al. |
| 2008/0080820 A1 | 4/2008 | Andrews et al. |
| 2008/0087082 A1 | 4/2008 | Andrews et al. |
| 2008/0121171 A1 | 5/2008 | Hulsey |
| 2008/0198618 A1* | 8/2008 | North .................. G02B 6/001 362/551 |
| 2008/0204235 A1* | 8/2008 | Cook .................. H01Q 1/2225 340/572.1 |
| 2008/0219621 A1 | 9/2008 | Aldeghi et al. |
| 2008/0273844 A1 | 11/2008 | Kewitsch |
| 2009/0027873 A1 | 1/2009 | Tarlton |
| 2009/0297104 A1 | 12/2009 | Kachmar |
| 2009/0299440 A9 | 12/2009 | Slatkine |
| 2010/0021114 A1 | 1/2010 | Chen et al. |
| 2010/0066254 A1 | 3/2010 | Ott et al. |
| 2010/0148747 A1 | 6/2010 | Rathbun, II et al. |
| 2010/0166374 A1 | 7/2010 | Lapp |
| 2010/0274235 A1 | 10/2010 | Mihajlovic et al. |
| 2010/0329604 A1 | 12/2010 | Kojima et al. |
| 2011/0034068 A1 | 2/2011 | Russell |
| 2011/0085776 A1 | 4/2011 | Biribuze et al. |
| 2011/0103747 A1 | 5/2011 | Chang et al. |
| 2011/0103757 A1 | 5/2011 | Alkemper et al. |
| 2011/0122646 A1 | 5/2011 | Bickham et al. |
| 2011/0150488 A1 | 6/2011 | Kewitsch |
| 2011/0305035 A1 | 12/2011 | Bickham et al. |
| 2012/0019900 A1 | 1/2012 | Kitson et al. |
| 2012/0219259 A1 | 8/2012 | Kewitsch |
| 2012/0275178 A1 | 11/2012 | Logunov |
| 2012/0275180 A1 | 11/2012 | Button et al. |
| 2012/0275745 A1 | 11/2012 | Logunov |
| 2012/0308183 A1 | 12/2012 | Irwin et al. |
| 2013/0021597 A1 | 1/2013 | Carlson, Jr. et al. |
| 2013/0088888 A1 | 4/2013 | Fewkes et al. |
| 2013/0107565 A1 | 5/2013 | Genier |
| 2013/0201001 A1 | 8/2013 | Ratnakar |
| 2013/0209037 A1 | 8/2013 | Cooke et al. |
| 2013/0209045 A1* | 8/2013 | Dean, Jr. .............. G02B 6/02033 385/113 |
| 2013/0272014 A1 | 10/2013 | Logunov et al. |
| 2013/0341922 A1 | 12/2013 | Jimenez Buendia |
| 2014/0016904 A1 | 1/2014 | Kachmar |
| 2014/0070639 A1 | 3/2014 | Tamura |
| 2014/0221763 A1 | 8/2014 | Vayser et al. |
| 2014/0227438 A1 | 8/2014 | Dean, Jr. et al. |
| 2014/0270639 A1 | 9/2014 | James, III et al. |
| 2014/0355295 A1 | 12/2014 | Kuchinsky et al. |
| 2014/0363134 A1 | 12/2014 | Bookbinder et al. |
| 2015/0043875 A1 | 2/2015 | Bookbinder et al. |
| 2015/0049992 A1 | 2/2015 | Bauco |
| 2015/0277059 A1 | 10/2015 | Raven et al. |
| 2015/0369986 A1 | 12/2015 | Logunov et al. |
| 2016/0116660 A1 | 4/2016 | Benjamin et al. |
| 2016/0139353 A1 | 5/2016 | Bauco et al. |
| 2016/0202418 A1 | 7/2016 | Fortin et al. |
| 2016/0231521 A1 | 8/2016 | Smith et al. |
| 2016/0313483 A1 | 10/2016 | Chomycz |
| 2016/0313513 A1 | 10/2016 | Wijbrans et al. |
| 2016/0341922 A1 | 11/2016 | Bauco et al. |
| 2016/0377818 A1 | 12/2016 | Tong et al. |
| 2017/0123167 A1 | 5/2017 | Isenhour et al. |
| 2017/0176691 A1 | 6/2017 | Childers et al. |
| 2017/0205587 A1 | 7/2017 | Chang et al. |
| 2017/0207585 A1 | 7/2017 | Butler et al. |
| 2017/0293102 A1 | 10/2017 | Bauco et al. |
| 2017/0315318 A1 | 11/2017 | Modavis |
| 2018/0128996 A1 | 5/2018 | Sawicki et al. |
| 2018/0136398 A1* | 5/2018 | Bauco .................. G02B 6/0006 |
| 2018/0172925 A1 | 6/2018 | Bauco et al. |
| 2019/0064447 A1 | 2/2019 | Chang et al. |

FOREIGN PATENT DOCUMENTS

| | | |
|---|---|---|
| CN | 102589728 A | 7/2012 |
| CN | 201305952 U | 7/2012 |
| CN | 203241575 U | 10/2013 |
| DE | 4413597 A1 | 10/1995 |
| DE | 10239602 B3 | 2/2004 |
| DE | 102007025494 A1 | 12/2008 |
| DE | 102009015263 A1 | 10/2010 |
| DE | 202015007044 U1 | 12/2015 |
| EP | 0874191 A2 | 10/1998 |
| EP | 0952589 A2 | 10/1999 |
| EP | 1168025 A2 | 1/2002 |
| EP | 2113969 A1 | 11/2009 |
| GB | 2260198 A | 4/1993 |
| GB | 2375898 A | 11/2002 |
| JP | 57011305 A | 6/1980 |
| JP | 59182404 A | 4/1983 |
| JP | 61139221 A | 6/1986 |
| JP | 61161827 U | 10/1986 |
| JP | 1990055506 A | 2/1990 |

(56) References Cited

FOREIGN PATENT DOCUMENTS

| | | |
|---|---|---|
| JP | 2108007 A | 4/1990 |
| JP | 2108008 A | 4/1990 |
| JP | 6017157 U | 3/1994 |
| JP | 06130253 A | 5/1994 |
| JP | 9178956 A | 7/1997 |
| JP | 9237524 A | 9/1997 |
| JP | 2008153030 A | 7/2008 |
| JP | 2009244288 A | 10/2009 |
| JP | 2010237233 A | 10/2010 |
| JP | 2013196960 A | 9/2013 |
| KR | 875507 B1 | 12/2008 |
| WO | 1998034144 A1 | 8/1998 |
| WO | 1999024856 A1 | 5/1999 |
| WO | 2000011484 A1 | 3/2000 |
| WO | 2005106899 A1 | 11/2005 |
| WO | 2006044177 A2 | 4/2006 |
| WO | 2006113114 A2 | 10/2006 |
| WO | 2007053371 A1 | 5/2007 |
| WO | 2008048955 A2 | 4/2008 |
| WO | 2010011299 A2 | 1/2010 |
| WO | 2010021896 A1 | 2/2010 |
| WO | 2011063214 A | 5/2011 |
| WO | 2013055842 A1 | 4/2013 |
| WO | 2013059811 A1 | 4/2013 |
| WO | 2013122825 A1 | 8/2013 |
| WO | 2014026300 A1 | 2/2014 |
| WO | 2015000194 A1 | 1/2015 |
| WO | 2016170172 A1 | 10/2016 |

OTHER PUBLICATIONS

Schott, "SpectraStream Glass Harnesses," Rev. Nov. 2006, 2 pages.
Spigulis, J., "Side-Emitting Fibers Brighten Our World in New Ways," Oct. 2005, Retrieved from www.osa-opn.org, 6 pages.
"Super Vision Fiber Optics Side Glow Cables," TriN01ihLighting. com, Tri North Lighting, Inc., n.d., Web. Aug. 1, 2013.
"Diode Lasers, Fiber Optics, IR, Red, Green, Blue Diode Lasers, Laser Diode, Fiber Illuminators, Fiber Optics, Coupler, Galvonarneters, Laser Show Acessories," Jan. 1, 2013, httn://www.meshtel.com/, 1 oage.
Lu et al. Optical fiber with nanostructured cladding of TiO2 nanoparticles self-assembled onto a side polished fiber and its temperature sensing, Optics Express, vol. 22, No. 26, Dec. 29, 2014, 7 pages, downloaded from internet on Jan. 5, 2015.
"Side Emitting Super Glowing Fiber." MeshTel.com. MeshTel-INTELITE, INC., 1996-2012. Web. Aug. 1, 2013.
Endruweit et al. "Spectroscopic experiements regarding the efficiency of side emmision optical fibres in the UV-A and visible blue spectrum", Optics and Lasers Engineering 46 (2008) pp. 97-105.
U.S. Appl. No. 62/193,638 "Systems and Methods for Traceable Cables", filed Jul. 17, 2015. 27 PGS.
U.S. Appl. No. 62/193,643 "Systems and Methods for Tracing Cables and Cables for Such Systems and Methods", filed Jul. 17, 2015. 33 PGS.
Hecht, "Understanding Fiber Optics", 4th Edition, 2002, pp. 106-107.

* cited by examiner

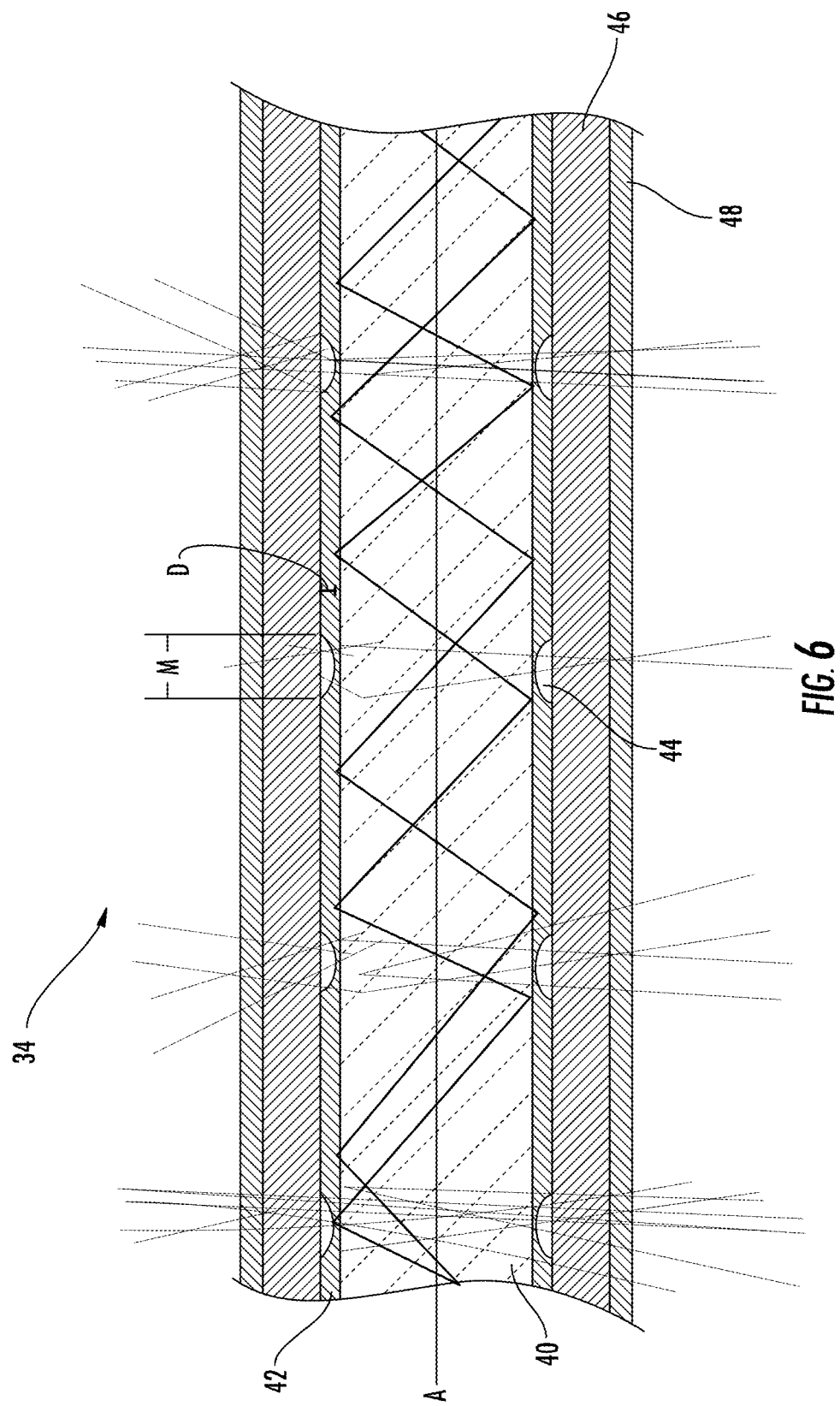

SYSTEMS AND METHODS FOR TRACING CABLES AND CABLES FOR SUCH SYSTEMS AND METHODS

CROSS REFERENCE TO RELATED APPLICATIONS

This application is a continuation of International Application No. PCT/US16/42416, filed on Jul. 15, 2016, which claims the benefit of priority to U.S. Application No. 62/221,774, filed Sep. 22, 2015 and U.S. Application No. 62/193,643, filed Jul. 17, 2015, the content of which is relied upon and incorporated herein by reference in entirety.

BACKGROUND

This disclosure generally relates to cables and cable assemblies, such as telecommunication patch cords, that are traceable due to the addition of a tracing optical fiber that emits light for visualization purposes. More particularly, this disclosure relates to systems and methods for tracing the cables and cable assemblies.

Today's computer networks continue to increase in size and complexity. Businesses and individuals rely on these networks to store, transmit, and receive critical data at high speeds. Even with the expansion of wireless technology, wired connections remain critical to the operation of computer networks, including enterprise data centers. Portions of these wired computer networks are regularly subject to removal, replacement, upgrade, or other moves and changes. To ensure the continued proper operation of each network, the maze of cables connecting the individual components must be precisely understood and properly connected between specific ports.

In many cases, a data center's cables, often called patch cords, are required to bridge several meters across the data center. The cables may begin in one equipment rack, run through the floor or other conduit, and terminate at a component in a second equipment rack.

As a result, there is a need for an improved system that allows a select cable to be quickly and easily traceable for the purpose of identifying the path and/or approximate terminal end of a given cable that is being replaced, relocated, or tested.

SUMMARY

The present disclosure includes traceable cables and systems and methods for tracing cables. In one embodiment, a traceable cable includes at least one data transmission element, a jacket at least partially surrounding the at least one data transmission element, and a tracing optical fiber incorporated with and extending along a length of the cable. The tracing optical fiber includes a core having a first index of refraction, a cladding having a second index of refraction less than the first index of refraction, and periodically spaced apart scattering sites spaced along the tracing optical fiber. The cladding substantially surrounds the core. The scattering sites have a spacing ratio of n sites per meter, and each scattering site is configured to scatter no more than about $1/(n*l)$ times an initial optical power provided to the tracing optical fiber.

According to one embodiment of a system in the present disclosure, the system includes a traceable cable like the one mentioned above. At least one end of the tracing optical fiber in the traceable cable is optically accessible. The system includes, in addition to the traceable cable, a launch tool having a light source for selectively providing light into the tracing optical fiber.

According to another embodiment, a traceable cable system includes a cable having opposed ends and a length defined between the opposed ends. The cable includes at least one data transmission element, a jacket at least partially surrounding the at least one data transmission element, and a tracing optical fiber incorporated with and extending along at least a portion of the length of the cable, wherein at least one end of the tracing optical fiber is optically-accessible. The system also includes a launch tool having a light source for selectively providing light into the tracing optical fiber and a remote control unit for operating the launch tool.

The present disclosure further includes a method of tracing a cable, wherein the cable includes at least one data transmission element, a jacket at least partially surrounding the at least one data transmission element, and a tracing optical fiber incorporated with and extending along the cable. The method includes optically coupling a launch tool with an end of the tracing optical fiber, wherein the launch tool includes a light source configured to emit tracer light) The method also includes using a remote control unit to adjust an output of the light source such that the tracer light is emitted from the light source and transmitted along the tracing optical fiber. Finally, the method includes identifying the cable based upon the tracer light emitted from the tracing optical fiber.

The present disclosure also includes a traceable cable system having a plurality of traceable cables. Each cable may include least one data transmission element, a jacket at least partially surrounding the at least one data transmission element, and a tracing optical fiber incorporated with and extending along at least a portion of the length of the cable. The tracing optical fiber may comprise a core having a first index of refraction, a cladding having a second index of refraction less than the first index of refraction, the cladding substantially surrounding the core, and periodically spaced apart scattering sites spaced along the tracing optical fiber at a spacing ratio of n sites per meter. At least some of the traceable cables have different lengths, with l meters being the length of any one of the traceable cables. Each scattering site is configured to scatter no more than about $1/(n*l)$ times optical power provided to a corresponding tracing optical fiber.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

FIG. 6 is longitudinal cross section of one embodiment of a tracing optical fiber for the traceable cable of FIG. 5.

DETAILED DESCRIPTION

Various embodiments will be further clarified by examples in the description below. In general, the description relates to systems, and subsystems thereof, for tracing cables, and cable assemblies containing at least one traceable optical fiber. This description also relates to methods of using the systems and subsystems described herein.

Figure 1:
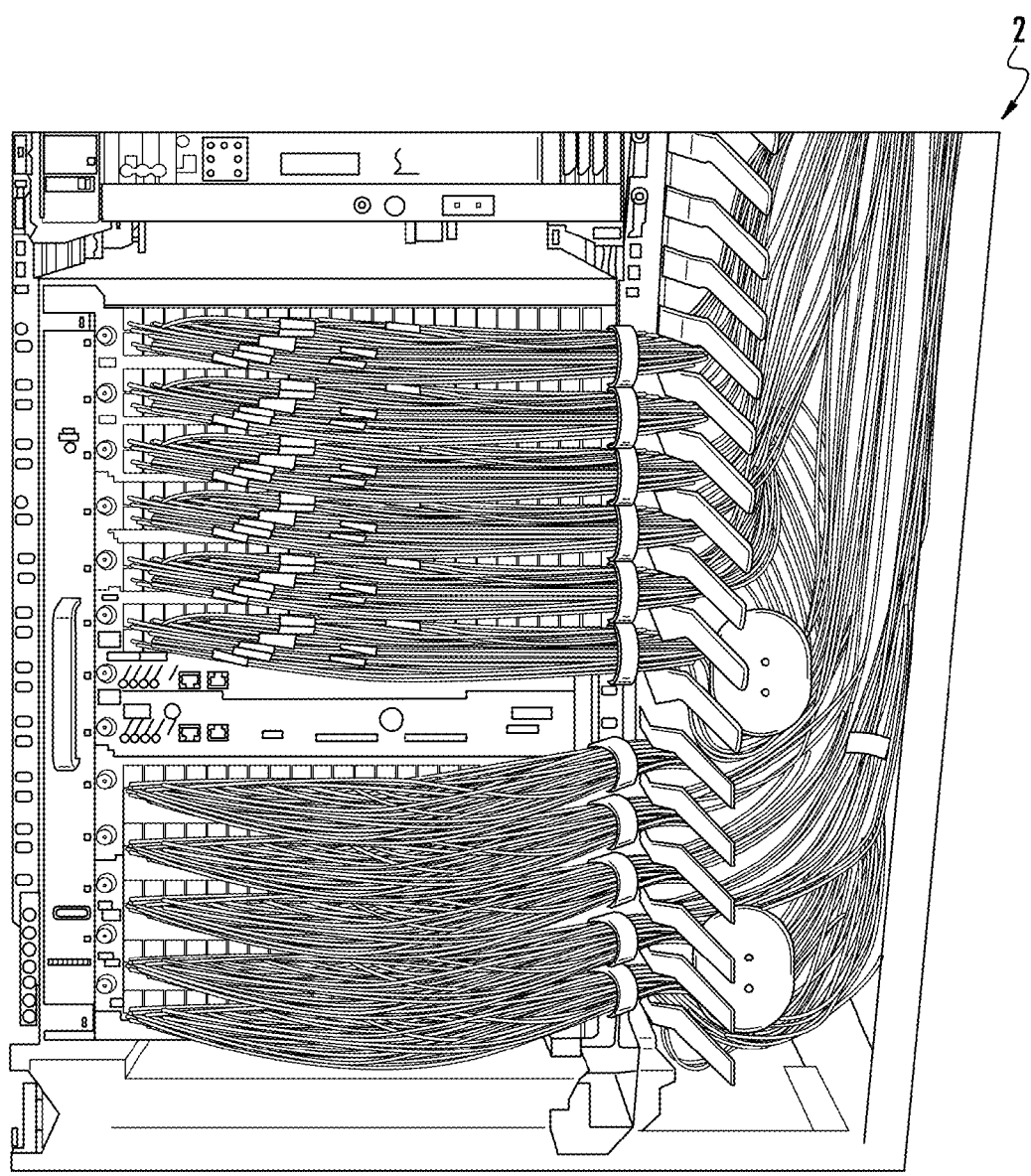
FIG. 1 is a perspective view of an equipment rack supporting patch cords.
Figure 2:
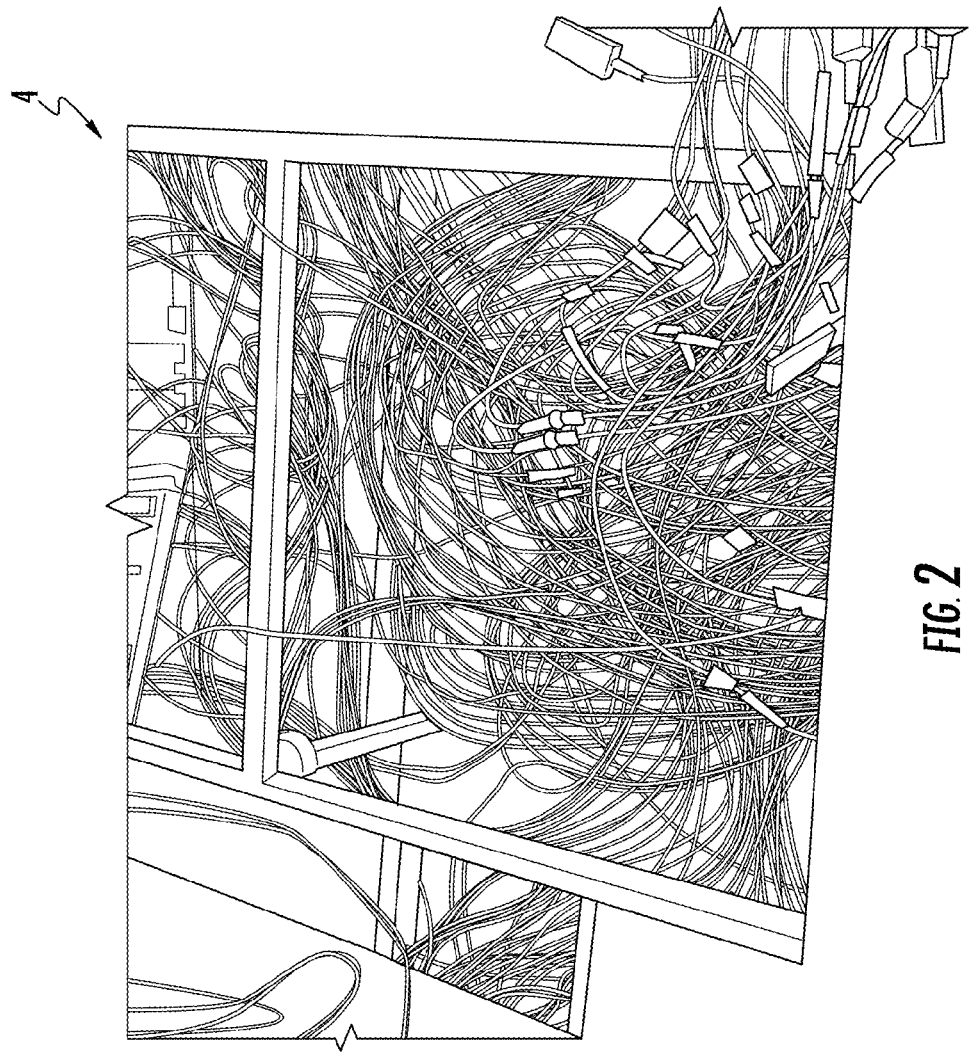
FIG. 2 is a perspective view of an under-floor cable tray supporting patch cords.

A problem that occurs in data centers or similar network locations is congestion and clutter caused by large quantities of cables. FIG. 1 shows an example of congestion in an equipment rack 2. FIG. 2 shows congestion in an under-floor cable tray 4. Network operators frequently desire to change connections to accommodate moves, adds, and changes in the network. However, such congestion makes it difficult to trace a particular cable from the source to the receiver, which may be required to perform the moves, adds, and changes in the network.

This disclosure provides various embodiments and components of a tracing system that allows for tracing operations performed on cables to be quickly and easily conducted by a single technician, resulting in a possible reduction of labor costs, down time, and errors. The tracing system makes the process of performing a trace or otherwise identifying a cable in a congested environment simple and fast for a service technician. As a result, the service technician can reliably identify the cable in question (which may be a telecommunications patch cord) from amongst many other cables (which may also be telecommunications patch cords). In some cases, the service technician may be able to reliably identify the cable in question along its length once tracing capability at one end of the cable has been activated. The tracing system may also have the advantage of being an optically-activated tracing system using only passive tracing elements within the cable (although active tracing elements, such as light emitting diodes or the like, may still be provided on the cable assembly in addition to the passive tracing elements, if desired). As will be described in greater detail below, the act of tracing, performed in connection with the disclosed system, involves tracing a cable based upon an optical signal or stimulus, for example, a visible spot of light that is provided by a source external to the cables themselves. The source external to the cables may alternatively provide non-visible light for tracing purposes, with the system including components to detect such non-visible light, as will be described in further detail below.

I. System Overview

Figure 3:
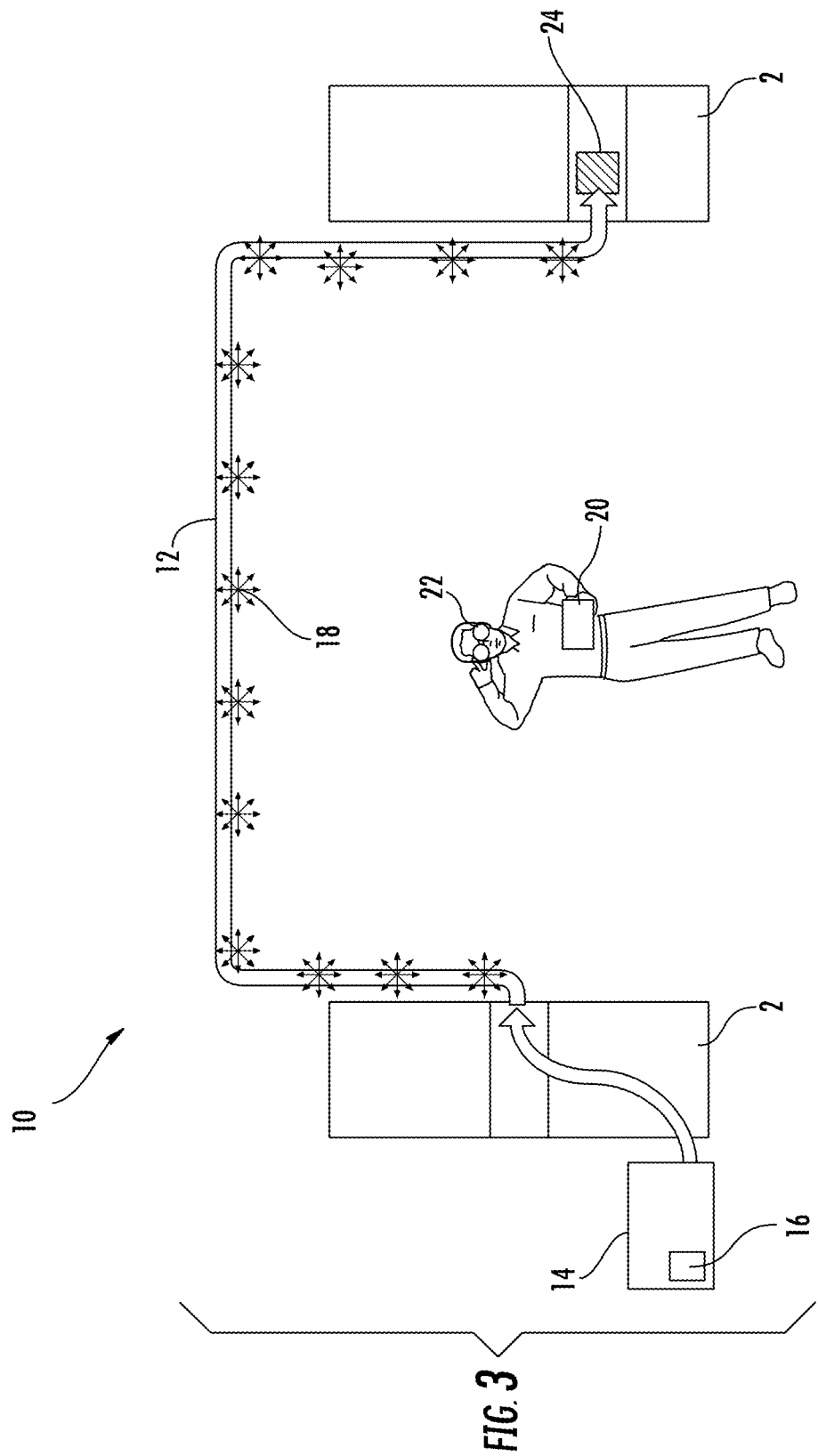
FIG. 3 is a schematic of a system for tracing a cable according to embodiments of the present disclosure.

An example tracing system 10 is schematically illustrated in FIG. 3. The tracing system 10 includes a traceable cable 12 (hereinafter "cable 12") extending between two locations, such as two equipment racks 2 in a data center, telecommunications room, or the like. The cable 12 may, for example, operably connect a port on a server in one of the equipment racks 2 with a port on a server in another of the equipment racks 2.

The tracing system 10 also includes a launch tool 14 configured to connect to the cable 12 and provide tracer light from a light source 16. The tracer light may provide illumination at discrete points along the cable 12. Such discrete points are represented by element 18 in FIG. 3 and will be referred to herein as emission points 18 or tracer locations 18. In alternative embodiments, the cable 12 may be configured to provide more continuous emission along its length or illumination only at or near ends of the cable 12. In some embodiments, the tracing system 10 may further comprise a controller 20 and an observation tool 22. These optional components of the tracing system 10 will be described in greater detail below.

Figure 4:
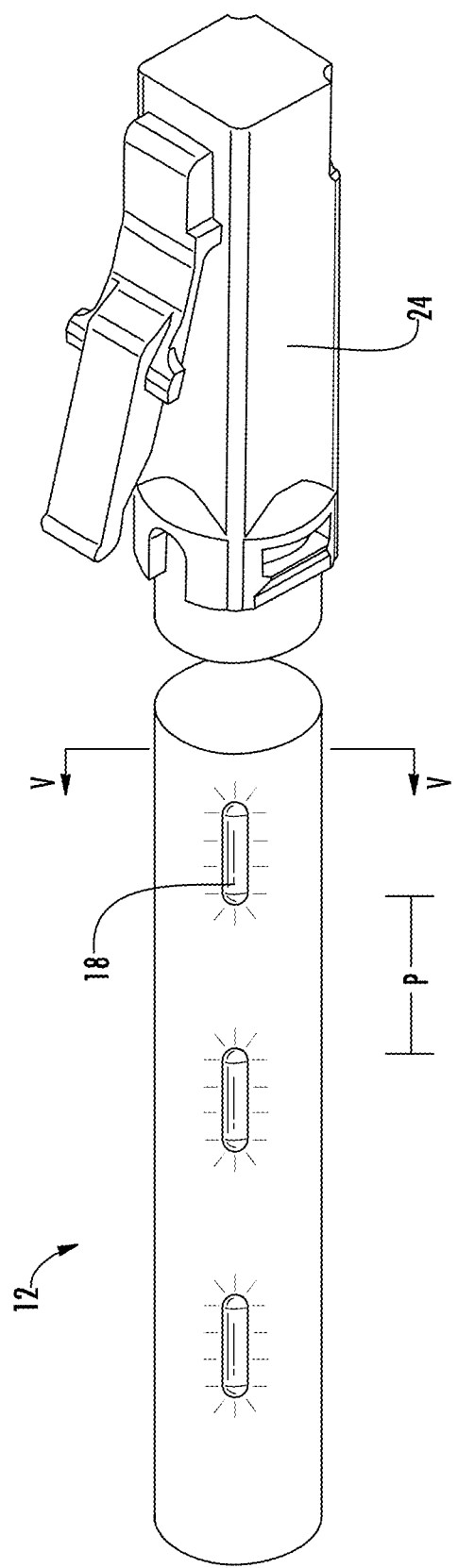
FIG. 4 is a side view, partially in cross-section, of a portion of a traceable cable assembly according to one embodiment.

FIG. 4 illustrates one embodiment of the cable 12 in slightly more detail. The cable 12 in this embodiment is part of a cable assembly that includes a connector 24 installed on an end of the cable 12. Although not shown, it should be understood that a similar or different connector may be present on an opposite end of the cable 12 to allow the cable assembly to act as a telecommunications patch cord between different components of a network. Additionally, it should be understood that the connector 24 may vary widely depending on the nature of the cable 12 (e.g., the quantity and type of signals transmitted) and the components being connected. The distance between the connectors 24 on opposite ends of the cable 12 may define a length l for the cable 12. The length l may be at least about one meter or even several tens of meters, such as thirty meters or more, depending on the intended use of the cable 12. The length l may be used interchangeably herein for the length of the cable 12 or its corresponding cable assembly or traceable optical fiber. Similarly, the maximum length L introduced below may be used interchangeably to describe the longest length of a cable, a cable assembly, or a corresponding traceable optical fiber in a given system or product set of traceable cables. Therefore, l and L are not limited to precise numbers.

II. Traceable Cable

Figure 5:
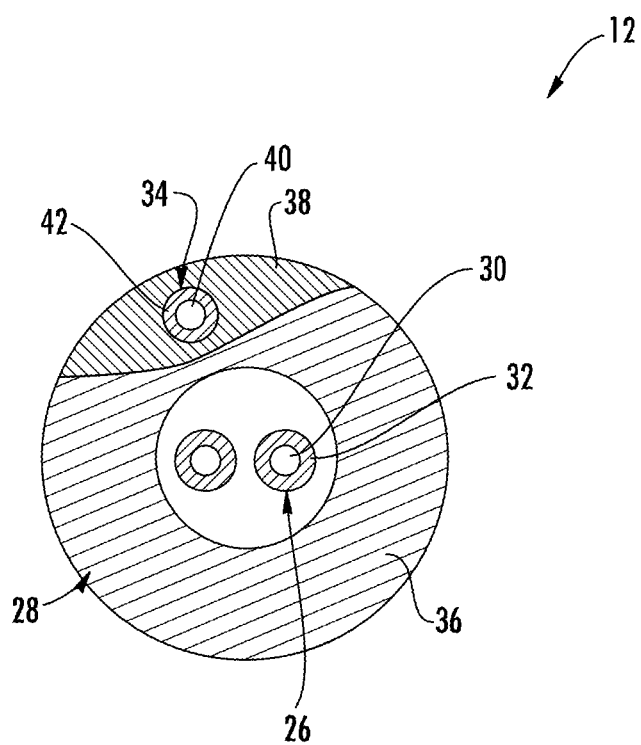
FIG. 5 is a cross-sectional view of the cable assembly of FIG. 4 along the plane V-V.

FIG. 5 is a cross section of the cable 12 to further represent one possible embodiment. As shown in FIG. 5, the cable 12 includes at least one data transmission element 26 (two data transmission elements 26 are shown in FIG. 5 for illustrative purposes) and a jacket 28 surrounding the data transmission elements 26. The data transmission elements 26 may be of the same type or different types as compared to one another. Generally, each data transmission element 26 is a structure capable of carrying a data signal from one end of the cable 12 to the other end of the cable 12. The data transmission elements 26 may each be configured to transmit an electrical signal using a copper wire or other electrically conductive material. Alternatively, one or both of the data transmission elements 26 may be configured to transmit an optical signal by conducting electromagnetic waves to carry data from one location to another. The data transmission elements 26 shown in FIG. 5 are of the latter type (i.e., optical transmission elements), with each having a core 30 and a cladding 32.

In alternative embodiments, the cable 12 may be more appropriately referred to as a conduit, without having any data transmission elements 26. Instead of transmitting a data signal, these cables may transmit fluids such as air or liquid. These cables may be appropriate for use in a medical setting such as IV lines or oxygen tubing.

Still referring to FIG. 5, the jacket 28 may be a hollow tube forming a conduit that surrounds the data transmission elements 26. Alternatively, the data transmission elements 26 may be at least partially embedded within the jacket 28.

The cable 12 further includes at least one tracer element, which is shown in the form of a tracing optical fiber 34 (also referred to as a "tracer optical fiber 34") configured to transmit and emit tracer light for visualization purposes. The tracing optical fiber 34 may be incorporated as part of the cable 12 in several configurations. In the embodiment shown in FIG. 5, the tracing optical fiber 34 is embedded within a portion of the jacket 28. More specifically, the jacket 28 in the embodiment of FIG. 5 includes a pigmented portion 36 and an un-pigmented portion 38. The pigment used in the pigmented portion 36 may be selected to identify the nature of the cable 12 based on the number, type, and arrangement of data transmission elements 26 therein. The tracing optical fiber 34 is embedded within the un-pigmented portion 38, which may include some pigment but in any event is more optically transparent than the pigmented portion 36.

In alternative embodiments, the jacket 28 may not include an un-pigmented portion 38. The tracing optical fiber 34 may still be embedded within the jacket 28 in such embodiments. Alternatively, the tracing optical fiber 34 may be adjacent to the data transmission elements 26, inside the conduit defined by the jacket 28. If the tracing optical fiber 34 is within such a conduit, the jacket 28 may have at least some areas that are highly transparent. In yet other embodiments, the tracing optical fiber 34 may be provided on, mounted to, or otherwise attached to an outside of the jacket 28.

The tracing optical fiber 34 includes a core 40 having a first index of refraction, and a cladding 42 at least partially surrounding the core 40. The cladding 42 has a second index of refraction different, and lower, than the first index of refraction. The tracing optical fiber 34 may be configured to emit light at ends of the tracing optical fiber 34 and/or along the length of the tracing optical fiber 34 in a continuous or periodic manner. The tracing optical fiber 34 may, for example, include features or otherwise be configured to scatter light at discrete locations along the length of the tracing optical fiber 34. Such periodic scattering of light may form the emission points 18 (FIG. 3) of the cable 12, alone or in combination with features on the jacket 28, such as openings/windows (not shown) in the jacket 28 or portions of reduced material thickness between the tracing optical fiber 34 and an outer surface of the jacket 28. Embodiments where the tracing optical fiber 34 is configured to scatter light in a periodic manner will now be described in further detail. In such embodiments, the tracing optical fiber 34 may be referred to as a "side-emitting optical fiber" for reasons that will be apparent.

III. Exemplary Tracing Optical Fibers

The tracing optical fibers 34 may embody a variety of structures or manufacturing techniques to achieve the desired scattering of light. As discussed above, and as shown in FIG. 6, the tracing optical fiber 34 includes at least a core 40 and a cladding 42. The core 40 may be made from glass, particularly silica-based glass, or a polymer. The size of the core 40 is not particularly limited, but in some embodiments diameters may be between and including about 100 microns and about 250 microns. The core may be, for example, 125 microns. Cores that are significantly smaller may be subject to damage from handling, and cores that are significantly larger may be subject to damage when bending.

In some embodiments, the core 40 may be a substantially solid core, generally free of voids or air pockets as found within the airline type of diffusive optical fibers. A core 40 that is free from voids may facilitate splicing, polishing, or other processing operations, which may be needed in some embodiments to make ends of the tracing optical fiber 34 compatible with the launch tool 14 (FIG. 1).

The cladding 42 may be a polymer, such as fluoro-acrylate. The material for the cladding 42 is selected to have an index of refraction that differs from the index of refraction of the core 40. In some embodiments, the index of refraction of the cladding 42 is lower than that of the core 40. In some embodiments, the different indices of refraction produce a step-index optical fiber. In other embodiments, the tracing optical fiber 34 may be a trapezium or triangular index optical fiber. The cladding 42 closely surrounds the core 40 to help maintain light within the tracing optical fiber 34. The cladding 42 may have a thickness between about 4% and about 40% of the diameter of the core 40. For example, the cladding 42 may be between about 5 and about 50 microns thick from the surface of the core 40 to an exterior surface of the cladding 42 when the core 40 has a diameter of 125 microns.

According to some embodiments of the tracing optical fiber 34, scattering sites 44 are selectively provided at spaced apart locations on the cladding 42 along the length of the tracing optical fiber 34. The scattering sites 44 are configured to provide areas where light, which is otherwise traveling along the tracing optical fiber 34, is scattered and therefore able to be emitted from the side of the tracing optical fiber 34, as shown in stippled lines in FIG. 6. As alluded to above, the scattering sites 44 may form the emission points 18 shown in FIG. 3, alone or in combination with features on the jacket 28.

The scattering sites 44 may be areas where the exterior surface of the cladding 42 is modified, removed, deformed, or damaged to produce optical surfaces tending to scatter incoming light. Some or all of the scattering sites 44 may be annular or otherwise generally ring shaped, extending around the entire circumference of the tracing optical fiber 34. In some embodiments, each scattering site 44 may not extend around the full circumference of the tracing optical fiber 34. The scattering sites 44 may sweep an arc approximately 180 degrees, 90 degrees, or even less around the circumference.

A complete ring shape may provide the most uniformly scattered light, but a full ring is not believed necessary to have light scatter in all 360 degrees around a lengthwise axis A of the tracing optical fiber 34 and/or light to be seen 360 degrees a lengthwise axis of the cable 12. The scattering sites 44 scatter light generally in all directions with varying intensity. Therefore, each scattering site 44 directs light immediately out of an adjacent portion of the exterior surface of the cladding 42, and also directs light back through the core 40 and out an opposite portion of the optical fiber 34. Scattering light from the tracing optical fiber 34 about 360 degrees can be desired to avoid directionality in light emission from the tracing optical fiber 34. This may be advantageous because directionality may require more precise orientation of the tracing optical fiber 34 with the jacket 28 and cable 12. If the tracing optical fiber 34 emitted light in a particular direction, that emission direction may need to be oriented toward the exterior of the cable 12 to be visible. Again, by scattering light 360 degrees around the lengthwise axis A of the tracing optical fiber 34, the tracing optical fiber allows the scattered light be to be seen from any viewpoint around the lengthwise axis of the cable 12.

The scattering sites 44 may be produced by a variety of mechanical, optical, or chemical processes. In the embodiment of FIG. 6, the scattering sites 44 may be produced as the result of ablation caused by impact with high intensity light from a laser (not shown). The ablation process removes some of the cladding 42 and leaves behind an optically rough surface portion.

In other embodiments not shown herein, the scattering sites 44 may be areas where scattering material is disposed on the exterior surface of the core 40, prior to applying the cladding 42, to produce optical surfaces tending to scatter light. A variety of scattering materials may be used to form the scattering sites 44. The scattering material may, for example, be an ink having scattering particles disposed in a binder. Materials with a high index of refraction, such as titanium dioxide (TiO2), are particularly suitable scattering particles. Materials with an index of refraction that is substantially different from that of the scattering particles, and that are configured to adhere to the core 40, are particularly suitable binders. The binder may even be the same material as the core 40 or cladding 42.

Regardless of how the scattering sites 44 are formed on the tracing optical fiber 34, several characteristics of the scattering sites 44 may be refined to help traceability of the cable 12. First, the separation between the scattering sites 44 may be selected to address the unique challenges associated with cable assemblies for data centers or similar network locations. In one embodiment, the scattering sites 44 should be at least about one cm apart and less than about one meter apart. Scattering sites 44 that are too close together approach a uniform emission along the length of the cable 12 and may lose the efficient use of light provided by discrete locations. Scattering sites 44 that are too far apart may lose the ability to sufficiently trace along the length of the cable 12 when used together with several other cables. Scattering sites 44 that are too far apart may also result in a lack of scattering sites 44 sufficiently close to the ends of the cable 12 to properly identify the connectors 24 of the cable 12 amongst many other connectors. An approximate separation P of between about 5 cm and about 50 cm may balance the light efficiency and traceability benefits, keeping in mind that several of the scattering sites 44 may be hidden behind other cables, effectively increasing the relative spacing therebetween.

In some embodiments, the separation P may facilitate identifying the overall length of the cable 12. For example, the separation P may correspond to a single unit of length in the International System of Units or Imperial System. Thus, in some embodiments, the separation P may be about one meter, thereby allowing a person to count the scattering sites 44 to approximate the total length l of the cable in meters. In other embodiments, the approximate separation P may be about one foot, thereby allowing a person to count the scattering sites to estimate the total length l of the cable in feet.

Still referring to FIG. 6, the tracing optical fiber 34 may further include at least one coating 46 applied to the exterior surface of the cladding 42 as a layer of protection for the core 40 and the cladding 42. The coating 46 may be between about ten and about seventy microns thick in some embodiments and made from acrylate. The coating 46 may be at least translucent, if not fully transparent, in locations corresponding with the scattering sites 44. Alternatively, the coating 46 may have light transmission windows. In other embodiments, the coating 46 may have generally uniform light transmission characteristics.

The tracing optical fiber 34 may also include an ink layer 48 applied to the coating 46. The ink layer 48 may be selectively applied to locations corresponding with the scattering sites 44. Alternatively, the ink layer 48 may be uniformly applied to the coating 46. The ink layer 48 may have further scattering elements, such as titanium dioxide spheres, configured to diffuse the light being emitted from the tracing optical fiber 34. The ink layer 48 may be configured to provide each scattering site 44 with an approximate Lambertian distribution pattern.

Now referring collectively to FIGS. 3, 4, and 6, the scattering sites 44 may efficiently release light at the emission points 18 without imparting directionality to the cable 12. As used in this context, directionality refers to the situation where the ability to trace the cable 12 is different depending on which end of the cable 12 is receiving the initial tracer light. An example of such a situation is where scattering sites 44 are provided that become increasing more efficient the closer the scattering sites are to an end of the cable 12 where maximum brightness is desired. If this approach were used, the tracing may be highly effective when tracer light is launched into the tracing optical fiber 34 at one end of the cable 12 (i.e., a bright spot may be easily seen at the far end of the cable 12), but much less effective when tracer light is launched into the tracing optical fiber 34 at the other end of the cable 12.

Further, in high volume manufacturing it may be desirable to have each scattering site 44 as similar as possible, if not identical, so that one process can be optimized, designs can be standardized, and the cable 12 can be cut and used to form various length cable assemblies that each provide a sufficient degree of traceability.

The fraction of light scattered out of the tracing optical fiber 34 from each of the scattering sites 44, also referred to as the "scattering fraction," may be an input in determining the minimum optical power needed to activate the tracing system 10. At the minimum required optical power for the light source 16, there should be enough light emitted from the farthest scattering site 44 to be easily seen by a service technician operating in a well-lit environment. Based on the reasonable approximations that the optical power within the tracing optical fiber 34 decays exponentially with distance, and that each of the scattering sites 44 is identical, the most efficient scattering fraction is 1/N, where N is the total number of scattering sites 44, and where each scattering site may be configured to emit no more than 1/N times optical power. N also equals n*l, where n is number of scattering sites 44 per unit length and l is the length of the tracing optical fiber 34, often approximated as the length of the cable 12. Further, emission of each scattering site can be controlled only to a certain extent. As such, the emission of each scattering site may be generalized by the term "about" that is used herein to describe emission within 10% of a suggested optimal or desired emission.

In one example, a cable assembly may be approximately thirty meters in length with scattering sites 44 spaced periodically every ten cm, resulting in three hundred total scattering sites. If there are three-hundred scattering sites, the optimal scattering fraction should be ⅟300th of the initial optical power launched into the tracing optical fiber 34. If a manufacturer makes equal scattering fractions for each scattering site 44, then the choice of scattering fraction can be determined based on the following steps:

(a) determine a maximum length (L) of a traceable cable assembly that will be produced;

(b) use the determined length (L) from step (a) and the desired number of scattering sites per unit length (n) (i.e., the spacing ratio) to determine the total number of scattering sites (Nmax) in the longest cable assembly; and
(c) manufacture the tracing optical fiber 34 with substantially identical scattering sites spaced apart by (1/n), where each scattering site 44 has a scattering fraction equal to 1/Nmax.

As can be appreciated, L may be the longest length traceable cable assembly among a plurality of traceable cable assemblies that make up a system.

In other embodiments, the average scattering fraction for may be 1/Nmax, but each scattering site 44 may not be substantially equal. For example, the scattering fraction of each scattering site 44 may follow a secondary pattern, like a sinusoidal variation or a random variation, with some scattering sites 44 emitting more light than others while resulting in substantially exponential decay over a large number of scattering sites.

Techniques and parameters for achieving the desired scattering fraction from each scattering site 44 will depend upon the structure used to achieve scattering. For example, where scattering sites 44 are produced by laser ablation, the scattering fraction of each site may be adjusted by altering the magnitude M of each scattering site along the optical fiber 34 (see FIG. 6; "magnitude M" refers to the length of each scattering site 44 measured parallel to the lengthwise axis A of the tracing optical fiber 34), the sweep angle of ablation around the lengthwise axis A of the tracing optical fiber 34, and the depth of ablation D into the cladding 42. Similarly, where scattering sites 44 are provided by areas or patches of scattering particles within a binder (not shown), the scattering fraction may be refined by adjusting the magnitude of each scattering site, the sweep of each scattering site around the optical fiber, the material of the scattering particles, and the density of the scattering particles within the binder.

As can be appreciated, if the brightness of emission from the most distal point is sufficiently strong in the longest cable assembly for a given input optical power, the brightness from each scattering site 44 along a shorter cable assembly will necessarily be sufficiently bright.

In turn, the scattering fraction can be used to determine the minimum required optical power needed from the light source 16. Working backwards, minimizing optical power is desired for a variety of reasons, including to reduce costs and minimize eye safety concerns. Therefore, a goal may be to provide the minimum optical power necessary while providing a level of brightness at the far end of a cable assembly such that the last scattering site will still be sufficiently visible to a technician in a well-lit room. To make this determination, the following equation may be used:

$$Pout = Pin * T^{N-1} * (1-T) * Eff,$$

where Pout is the optical power at the furthest location based on the input power Pin, N is the total number of scattering sites when Pout represents the emission at the last scattering site, T is the fraction of the power maintained in the optical fiber at each scattering site, and Eff is the efficiency of the scattering site. If transmission through the fiber itself is a significant source of loss, this excess loss can be incorporated into T.

To determine the minimum input power, the equation can be rewritten as:

$$Pin = \frac{Pout}{Eff} * \frac{1}{T^{N-1} * (1-T)}$$

Pin can then be defined as a function of T:

$$\frac{dPin(T)}{dT} = \frac{Pout}{Eff} * \frac{T^{-N}}{1-T} * \left( (1-N) + \frac{T}{1-T} \right)$$

Further simplifying for a minimum, Pin(T) provides:

$$T = (N-1)/N$$

Therefore, if the proportion of power maintained within the optical fiber is T, the proportion of power that can be scattered out of the tracing optical fiber 34 at each scattering site 44 is:

$$E = 1 - T$$

$$E = 1 - (N-1)/N$$

$$E = 1/N$$

The size of each scattering site 44 may include reference to the magnitude M and depth D as seen in FIG. 6. If scattering material (e.g., ink containing TiO2 particles) is added to the cladding 42 to form the scattering sites 44, a thickness of the scattering material may be analogous to the depth D shown. The size may also include the sweep of the scattering site 44 around the circumference of the optical fiber 34. Balancing these three aspects of the size (magnitude M, depth D, and sweep) may control the scattering fraction to the desired level as discussed above. For example, a larger magnitude M, a deeper depth D, and a large angle of sweep may increase the amount of light emitted from a scattering site 44.

IV. Launch Points

It has already been mentioned that tracer light must be launched into the tracing optical fiber 34 in order to trace the cable 12. Several methods have been contemplated for providing the tracing optical fiber 34 with tracer light from an external source. One example is through a launch tool that forms a bend in the cable 12, as discussed in U.S. Pat. No. 8,620,123. In other embodiments, the cable 12 may be provided with one or more dedicated launch points at or near each end of the cable 12, with each launch point being configured to provide optical access to the tracing optical fiber 34. The launch points may be designed as part of connectors on the ends of the cable 12 (such as connector 24 in FIG. 4) or directly in the cable 12, such as on the jacket 28 independent of connectors on the ends of the cable 12.

Figure 7A:
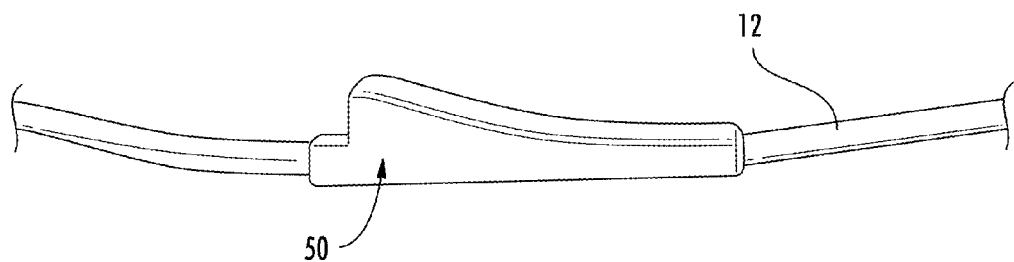
FIGS. 7A and 7B are respective perspective and cross-sectional views of a first example of a launch point on a traceable cable.
Figure 7B:
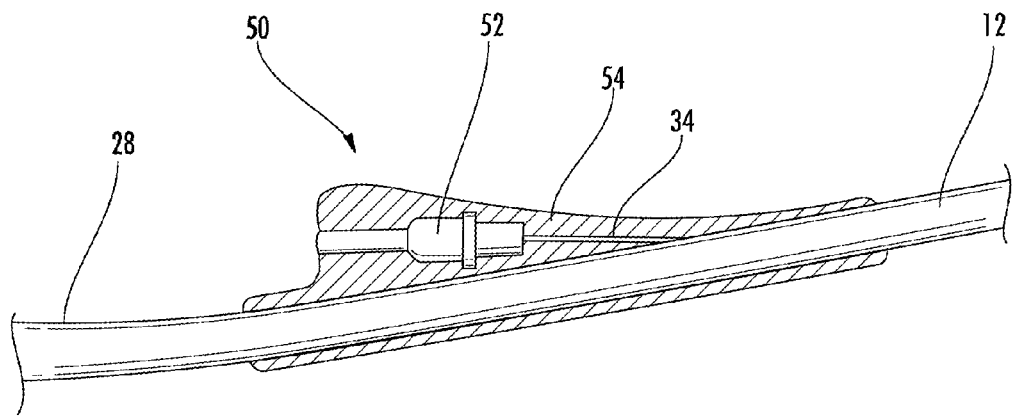

FIGS. 7A and 7B are perspective and cross-sectional views of an embodiment of a launch point 50 for the cable 12 where the end of the tracing optical fiber 34 is mounted in a ferrule 52 held to one side of the cable 12 by a clamshell 54. The launch tool 14 (FIG. 3) may clasp the clamshell 54 or the cable 12 and allow light to be coupled directly into the end of the tracing optical fiber 34. A split sleeve (not shown) or similar coupling device may be used to align and hold the ferrule 52 in physical contact with a ferrule (not shown) on the launch tool 14. The clamshell 54 is configured to accommodate the split sleeve around at least a portion of the ferrule 52 in such embodiments. The ferrule 53 may have conventional dimensions/geometry so that a standard split-sleeve can be used to produce an end-to-end connection between complementary ferrules.

Figure 8:
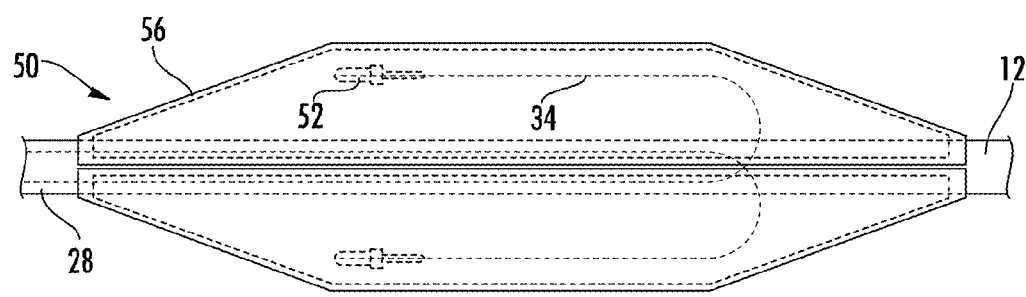
FIG. 8 is a schematic view of a second example of a launch point on a traceable cable.

FIG. 8 a schematic view of another embodiment of a launch point 50 that allows the use of standard optical ferrules or receptacles for launching light into the tracing optical fiber 34. In this embodiment, a protector 56 may be selectively closed around the cable 12 or the connector 24. The protector 56 is hollow and used to protect an end portion of the tracing optical fiber 34 extending from the cable 12. The end portion of the tracing optical fiber 34 is terminated with a ferrule 52, which may be a conventional/standard ferrule like the embodiment in FIGS. 7A and 7B. When the tracing optical fiber 34 is to be illuminated, the protector 56 may be removed, and the ferrule 52 may be accessed for mating with a compatible optical receptacle or sleeve from the launch tool 14 (FIG. 3).

The clamshell 54 (FIGS. 7A and 7B) and/or the protector 56 (FIG. 8) may be shaped to provide a smoothly tapered surface so that the launch point 50 does not tend to snag when the cable 12 is being installed or removed. The clamshell 54 and/or the protector 56 may also be made from a translucent diffusive material to further diffuse light exiting the tracing optical fiber 34. The protector 56 may also keep the end of the tracing optical fiber 34 clean in anticipation of being the end of the cable 12 where tracer light is launched into the tracing optical fiber 34.

V. Launch Tool

Figure 9:
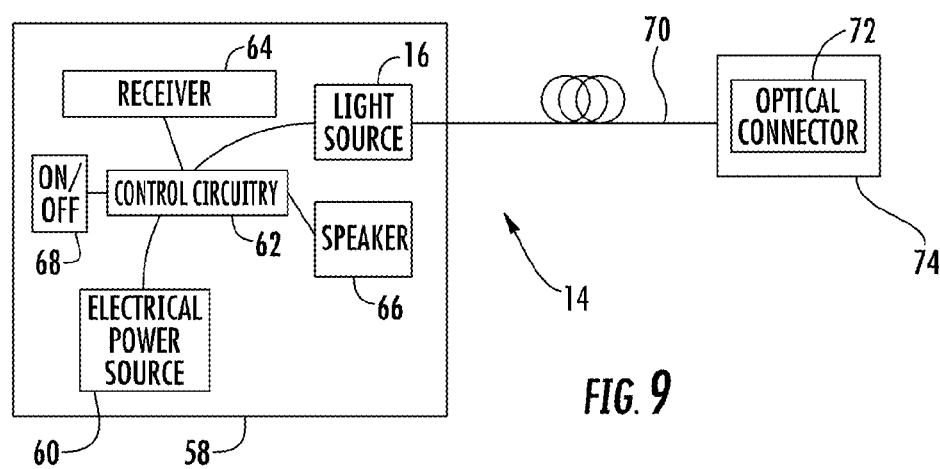
FIG. 9 is a schematic view of a launch tool according to one embodiment.

One example for the launch tool 14 referred to above is schematically shown in FIG. 9. The launch tool 14 may have a number of elements stored in a housing 58, including the light source 416 (e.g., a red or green laser), an electrical power source 60 (e.g., batteries), and control circuitry 62 to control the light source 16 and power usage. A receiver 64 or other wireless communication components, such as a combination transmitter/receiver, may be also be included in or on the housing 58 to receive commands from the controller 20 (FIG. 3) and optionally transmit information back to the controller. Furthermore, a speaker 66 may be included to allow for the generation of audible signals. Audible signals may make recovery of the launch tool 22 easier in a crowded data center environment. The housing 58 may also include an on-off switch 68 and be designed approximately the size of a standard flashlight or smaller. The housing 58 should be sufficiently durable to protect the launch tool 14, even in the event of a drop onto a hard surface.

In one embodiment, the light source 16 may be a semiconductor laser emitting green light at a wavelength between 510-540 nm. Alternatively, other colors/wavelengths may be emitted, such as red light from approximately 620 to 650 nm. In yet other embodiments, the light source may be configured to generate both green light and red light. The color of the emission may be selected by the technician based on their preference or the light source 16 may operate the colors simultaneously or in an alternating blinking pattern at rates that may be adjustable. In other embodiments, non-laser light sources may be used, such as light emitting diodes (LEDs). Determining the light source 16 may involve consideration, evaluation, and testing of several factors, including visibility, cost, eye safety, peak power, power consumption, size, and commercial availability.

When selecting between LEDs and semiconductor lasers for the light source 16, one difference is the etendue of these light sources, which is equal to the cross-sectional area of where light is emitted from the source multiplied by the solid angle occupied by the light emitted from the source. For efficient coupling into an optical waveguide (such as the tracing optical fiber 34), the etendue of the source must be smaller than the etendue of the receiving waveguide, which is the product of the receiving waveguide's acceptance solid angle and the core area of the receiving waveguide. Based on etendue, only about 1% of the light from a typical LED can be coupled into the receiving waveguide. However, essentially 100% of a single mode laser can be coupled into the receiving waveguide.

To determine a wavelength, one consideration is that green wavelengths in the 510 to 540 nm range are generally more visible to the human eye than the red wavelengths in the 620 to 650 nm range, on a per power basis. Applicant has found that the ratio varies from 510 nm being 32% more visible than 620 nm, to 540 nm being nearly nine times more visible than 650 nm. Red lasers, however, are presently about half the cost of green lasers, and therefore may be used in some embodiments.

Another parameter to consider is the color contrast of red or green light against the background color provided by the cable 12 itself. For example, patch cords in data centers are often provided with an aqua colored jacket. Therefore, red light may be more visible based on its large color contrast against an aqua background, whereas green light may have much less color contrast against the aqua backdrop. As the power of the laser is turned up, the color contrast becomes less important, but at low optical power, near the limit of observability, the higher color contrast of the red against an aqua background may be quite important. Applicant has found that the color difference of the red on aqua has a contrast ratio of 2.7, while the green on aqua has a very low contrast ratio of only 1.08. For comparison purposes, white on white has a contrast ratio of one, and black on white has a contrast ratio of twenty-one.

Returning to FIG. 9, the launch tool 14 may include a waveguide 70, sometimes referred to as an umbilical, that provides a path for tracer light to travel from the light source 16 to the tracing optical fiber 34. The waveguide 70 may include optional optics to help couple light from the light source 16 into the waveguide 70 or from the waveguide 70 into the tracing optical fiber 34. The waveguide 70 may be several meters in length so the housing 58 of the launch tool 14 can be placed on the ground while the end of the waveguide 70 is coupled with the cable 12.

As can be appreciated, a goal of the launch tool 14 is to launch/send tracer light into and down the tracing optical fiber 34 in a direction heading away from the near end of the cable 12. To do that, the terminal end of the waveguide 70 may need the waveguide to make a tight bend in some embodiments. Use of Corning® ClearCurve® optical fiber for the waveguide 70 may provide the desired light transmission, even around a tight bend.

In other embodiments, the terminal end of the waveguide 70 may be fitted with an optical connector 72 configured to reflect light from the waveguide 70 at a sharp angle into the tracing optical fiber 34. Such reflection or re-direction may be needed because there may be insufficient clearance to extend the waveguide 70 in the direction of transmission along the tracing optical fiber 34 when the cable 12 is connected to a component.

Attachment features 74 may also be provided at or near the terminal end of the waveguide 70 to precisely fasten the terminal end of the waveguide 70 to the cable 12 at the launch point 50. The attachment features 74 may include a clasping structure that holds the end of the waveguide 70 in a precise spot along the cable 12 and at a correct angle so that tracer light can couple into the tracing optical fiber 34. The attachment features 74 may provide a secure connection so that the waveguide 70 remains in optical communication with the tracing optical fiber 34 after the technician has stepped away (e.g., in search of the far end of the cable 12).

The launch tool 14 may have the ability to sense when it is properly in operational connection with the launch point 50, and provide a signal to the controller 20 that confirms the operational connection for the technician.

VI. Other System Accessories

Figure 10:
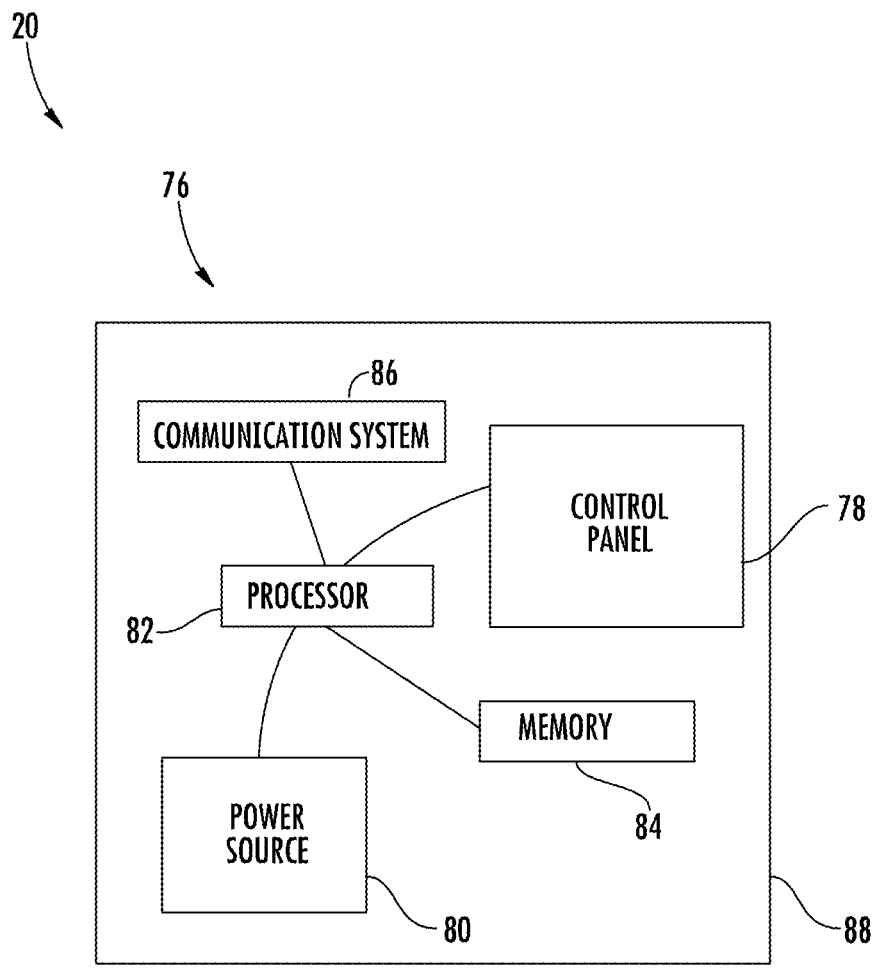
FIG. 10 is a schematic view of a remote control unit according to one embodiment.

Returning to FIG. 3, and as mentioned above, the tracing system 10 may include a controller 20. The controller may be a remote control unit in some embodiments. Elements and features of an exemplary remote control unit 76 are schematically illustrated in FIG. 10. The remote control unit 76 may be used by a technician to send operational commands to, and exchange information with, the launch tool 14 (or several launch tools, if provided). The use of the remote control unit 76 may assist with transforming a two-person task into a one-person task. The remote control unit 76 may also allow tasks to be more efficiently performed by limiting the number of trips the technician must take between potential end locations of a cable 12, e.g. trips between equipment racks 2 in a data center. Therefore, the remote control unit 76 speeds up the tracing and removal or replacement of the cable 12, saving labor costs.

The remote control unit 76 may have a control panel 78 with manual controls, a read out screen, and indicator lights. In some embodiments, the control panel 78 comprises a touch screen to replace all or some of the physical features. The remote control unit 76 may also have a power source 80, such as batteries. In some embodiments, all power sources in the tracing system 10 are small, standard, rechargeable batteries that are incorporated into the launch tool 14 and the remote control unit 76, and are not required as part of the cable 12 itself.

The remote control unit 76 may further comprise a processor 82, memory 84, a wireless communication system 86, and a robust packaging 88. The processor 82 interprets the commands coming in from the technician via the control panel 78 and turns them into commands which are sent out to the wireless communication system 86. Status information coming back from the launch tool 14 via the wireless communication system 86 is also interpreted by the processor 82 and may be displayed on the control panel 78. In some embodiments, the processor 82 may allow the remote control unit 76 to set up a unique identity for, and control, a plurality of simultaneously active launch tools 14.

In some embodiments, the packaging 88 may be provided with a clip or other means to attach to a tool belt or the like. In these or other embodiments, the remote control unit 76 may be a smart phone having an application that allows for the remote operation of the launch tool 14.

Optional functionality programmed into the remote control unit 76 and the launch tool 14 may allow for control of optical power, blink rate, blink duty cycle, and depth of modulation of the light source 16. Controlling power provides the ability to turn the power of the light source 16 up or down at a moment's notice, without having to take the time to run back to the launch tool 14, which may be located a significant distance away.

In another example, the launch tool 14 may create a color alternating blinking light that may have advantages for following the cable 12 and identifying its far end. Similar to a blinking feature being advantageous, because a blinking light source can reduce the required optical power by 50% or more, alternating colors also reduces the required optical power. The human vision system has the ability to de-emphasize static information in what is being observed and enhance changes in what is being observed. For example, if either intensity or color of an object varies with time, the human vision system enhances those objects. The launch tool 14 may contain two lasers (or other emitters) combined by technology known as an optical fiber combiner or some other suitable technology such as dichroic beam combiners or polarization beam combiners. The launch tool 14 may turn the lasers on and off in an alternating fashion such that the color of the tracing optical fiber 34 in the cable 12 would alternate. The frequency may be adjustable between rates of about one Hz to about five Hz. The remote control unit 76 may also influence the processor 82 to control the duty cycle of the two colors and the depth of modulation of each color. The sum of the duty cycles may be limited 100%.

In one example, the launch tool 14 may create a bright blinking light that may have advantages for following the cable 12 and identifying its far end. However, because the blinking may become distracting and possibly irritating, the remote control unit 76 may allow the technician to turn off the light source 16 after the end of the cable 12 has been identified. Use of a blinking feature may also be advantageous because a blinking light source can reduce the required optical power by 50% or more. The tracing system 10 may require over 100 mW of optical power, so a reduction of 50% is important for eye safety, the cost of the light source 16, the optical power budget, and battery life. For example, the blink rate may be adjustable between rates of about one Hz to about five Hz. The remote control unit 76 may also influence the processor 82 to control the duty cycle of the light source 16 and the depth of modulation.

The control panel 78 of the remote control unit 76 may also provide system status indicators, such as battery life indicators. Each of the remote control unit 76 and the launch tool 14 may have an indicator light that is illuminated when the power is on. These indicators may be useful so that a technician can avoid having a system shut down unexpectedly in the middle of a work shift because a battery's charge was depleted.

In some embodiments, the remote control unit 76 may be able to initiate locating features within the launch tool 14, such as an audible or visual signal generated by the launch tool 14. In yet other embodiments, the launch tool 14 may have the ability to produce a GPS signal detectable by the remote control unit 76.

A typical location where traceable cables are used is within a data center, as already mentioned. When used in such environments, the cable 12 is typically no longer than thirty meters and stretches between a server, storage, or switch element on one side and a patch panel on the other side. For a technician to communicate from the remote control unit 76 near one end of the cable 12 to the launch tool 14 (which may be thirty meters away), the wireless communication system 86 of the remote control unit 76 may be provided to allow for at least thirty meters of separation from the launch point 50 while maintaining operational communication.

Turning back to FIG. 3, and as mentioned above, the tracing system 10 may further comprise the observation tool 22. The observation tool 22 may be a pair of filter glasses in some embodiments. The filter glasses may enhance visibility of the wavelength emitted by the light source 16 and dampen the other visible wavelengths to increase the relative visibility of the cable 12. In another advantage, the filter glasses may allow for the light source 16 to be even lower power.

For example, a green laser light source provides light in a narrow spectral window, less than ten nm wide. If filter glasses are employed that attenuate the ambient light outside of the spectral window, the optical power of the light source 16 in such embodiments can be reduced by about 90%. While the attenuation of wavelengths outside of the desired spectral window could be nearly 100%, in other embodiments such other wavelengths may be attenuated by no more than 90% so that the technician can see both the surroundings and the filtering-enhanced tracer light.

Persons skilled in optical communications will appreciate additional variations and modifications of the systems and methods already described. For example, if tracer light is launched from a dedicated end of the cable 12, the scattering fraction could vary along the length of the tracer optical fiber 34 in an attempt to provide constant brightness of each scattering site 44 along the length. Without fraction-of-light-emitted variation, emitting spots near the launch end will be considerably brighter than those near the far end, but with the scattering fraction discussed above provided for sufficient brightness at the far end. In yet another example, two tracer optical fibers 34 may be used, where one is configured to transmit tracer light in one direction along the cable 12 and the other is configured to transmit tracer light in the other direction along the cable 12.

Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

The invention claimed is:

1. A traceable cable having a length of (l) meters, comprising:
    at least one data transmission element;
    a jacket at least partially surrounding the at least one data transmission element; and
    a tracing optical fiber incorporated with and extending along at least a portion of the length of the traceable cable, the tracing optical fiber comprising:
        a core having a first index of refraction;
        a cladding having a second index of refraction less than the first index of refraction, the cladding substantially surrounding the core; and
        periodically spaced apart scattering sites spaced along the tracing optical fiber at a spacing ratio of n sites per meter, wherein each scattering site is configured to scatter no more than about $1/(n*l)$ times optical power provided to the tracing optical fiber;
    further comprising at least one launch point on the jacket for optically accessing the tracing optical fiber, wherein the launch point comprises:
        a clamshell attached to the jacket, and
        a ferrule mounted to an end of the tracing optical fiber, wherein the ferrule is held by the clamshell.

2. The traceable cable of claim 1, wherein each scattering site is configured to scatter about $1/(n*l)$ times optical power provided to the tracing optical fiber.

3. The traceable cable of claim 1, wherein each scattering site is substantially identical.

4. The traceable cable of claim 1, further comprising:
    at least one connector terminating the traceable cable; and
    a launch point on the connector for optically accessing the tracing optical fiber.

5. The traceable cable of claim 1, wherein the launch point comprises:
    a ferrule mounted to an end of the tracing optical fiber, and
    a protector selectively attached around the jacket and the ferrule.

6. The traceable cable of claim 5, wherein opposite ends of the protector are tapered to minimize having the launch point act as a snag location.

7. The traceable cable of claim 5, wherein the protector comprises a translucent material configured to diffuse light emitted from the tracing optical fiber.

8. A system, comprising:
    a traceable cable according to claim 1; and
    a launch tool having a light source for selectively providing optical power into the tracing optical fiber, wherein each scattering site is configured to scatter no more than about $1/(n*l)$ times the optical power.

9. The system of claim 8, wherein the light source comprises at least two emitters of different colors configured to operate simultaneously.

10. The system of claim 8, wherein the light source comprises at least two emitters of different colors configured to alternate emission.

11. The system of claim 8, wherein the launch tool further comprises:
    control circuitry and a power source for operating the light source; and
    a waveguide configured to transmit light from the light source to the tracing optical fiber.

12. The system of claim 11, wherein the control circuitry is configured to provide adjustability to the optical power, blink rate, blink duty cycle, or depth of modulation of the light source.

13. The system of claim 11, wherein the waveguide is at least 1 meter in length.

14. The system of claim 8, further comprising:
    a remote control unit for operating the launch tool.

15. The system of claim 14, wherein the remote control unit is configured to signal the launch tool to adjust at least one of the optical power, blink rate, blink duty cycle, and depth of modulation of the light source.

16. The system of claim 14, wherein the remote control unit includes wireless communication components configured to operate the launch tool from at least 30 meters away.

17. The system of claim 14, wherein the remote control unit is capable of initiating a locating feature on the launch tool.

18. The system of claim 8, further comprising:
    an observation tool configured to attenuate ambient light.

19. A traceable cable system, comprising:
    a plurality of traceable cables each according to claim 1, wherein:
        at least some of the traceable cables have different lengths, with l meters being the length of any one of the traceable cables; and
        each scattering site is configured to scatter no more than about $1/(n*l)$ times optical power provided to a corresponding tracing optical fiber.

20. The traceable cable of system of claim 19, wherein L meters is the length of the longest traceable cable in the traceable cable system, and further wherein each scattering site is configured to scatter no more than about $1/(n*L)$ times optical power provided to the corresponding tracing optical fiber.

21. The traceable cable of system of claim 20, wherein each scattering site is configured to scatter about 1/(n*L) times optical power provided to the corresponding tracing optical fiber.

22. The traceable cable of system of claim 19, further comprising:
a launch tool having a light source for selectively providing the optical power into the tracing optical fiber of each traceable cable.

23. A method of forming a tracing optical fiber having a length (l) for use in a traceable cable assembly, comprising:
providing a core having a first index of refraction;
providing a cladding having a second index of refraction less than the first index of refraction, the cladding substantially surrounding the core;
forming substantially identical scattering sites spaced evenly along the optical fiber at a ratio of n sites per meter such that each scattering site scatters no more than about 1/(n*l) times optical power provided to the tracing optical fiber,
further comprising at least one launch point on the jacket for optically accessing the tracing optical fiber, wherein the launch point comprises:
a clamshell attached to the jacket, and
a ferrule mounted to an end of the tracing optical fiber, wherein the ferrule is held by the clamshell.

24. A traceable cable system, comprising:
a plurality of traceable cables each comprising:
at least one data transmission element;
a jacket at least partially surrounding the at least one data transmission element; and
a tracing optical fiber incorporated with and extending along at least a portion of the length of the traceable cable, the tracing optical fiber comprising:
a core having a first index of refraction;
a cladding having a second index of refraction less than the first index of refraction, the cladding substantially surrounding the core; and
periodically spaced apart scattering sites spaced along the tracing optical fiber at a spacing ratio of n sites per meter, wherein each scattering site is configured to scatter no more than about 1/(n*l) times optical power provided to the tracing optical fiber;
wherein at least some of the traceable cables have different lengths, with l meters being the length of any one of the traceable cables;
wherein each scattering site is configured to scatter no more than about 1/(n*l) times optical power provided to a corresponding tracing optical fiber; and
wherein L meters is the length of the longest traceable cable in the traceable cable system, and further wherein each scattering site is configured to scatter no more than about 1/(n*L) times optical power provided to the corresponding tracing optical fiber.

* * * * *